United States Patent Office 3,126,611
Patented Mar. 31, 1964

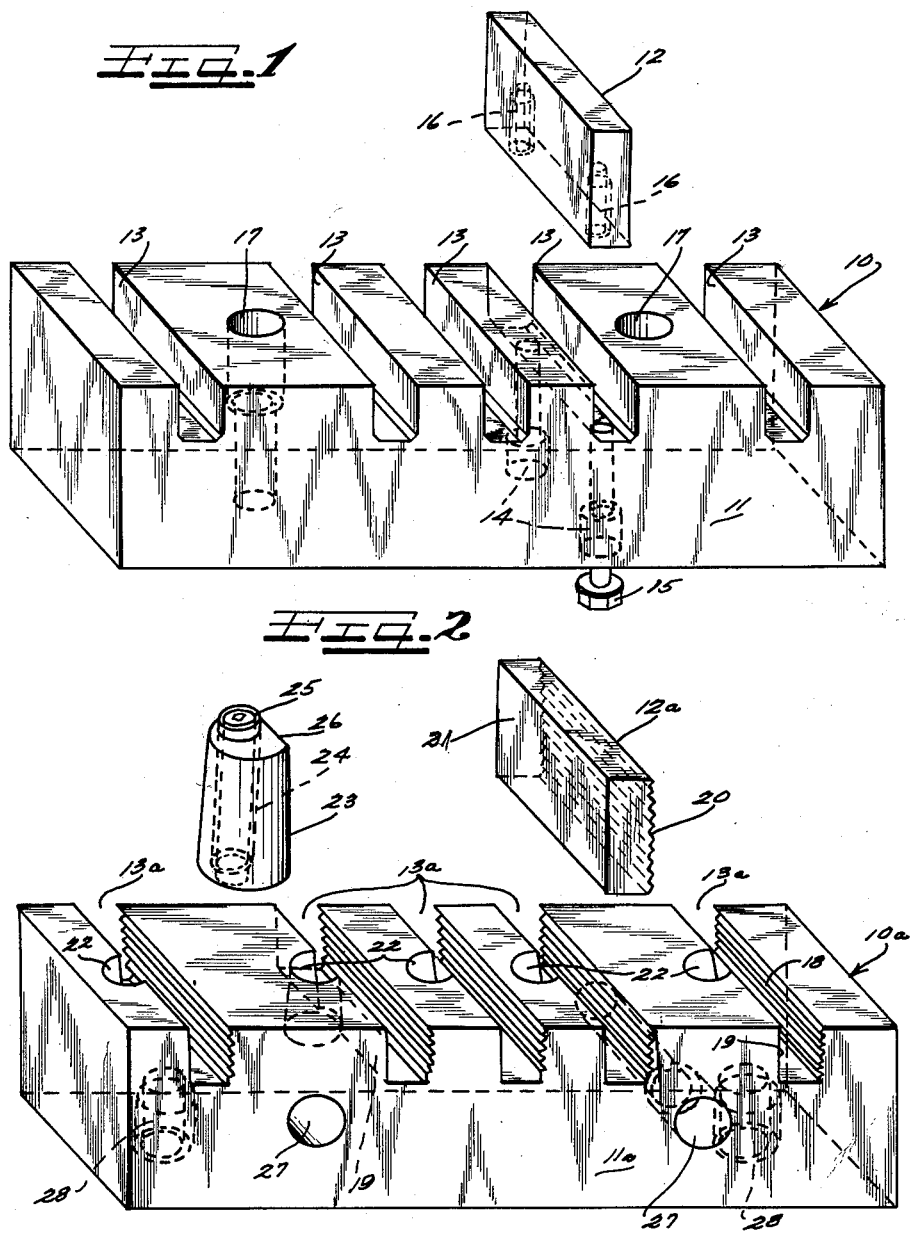

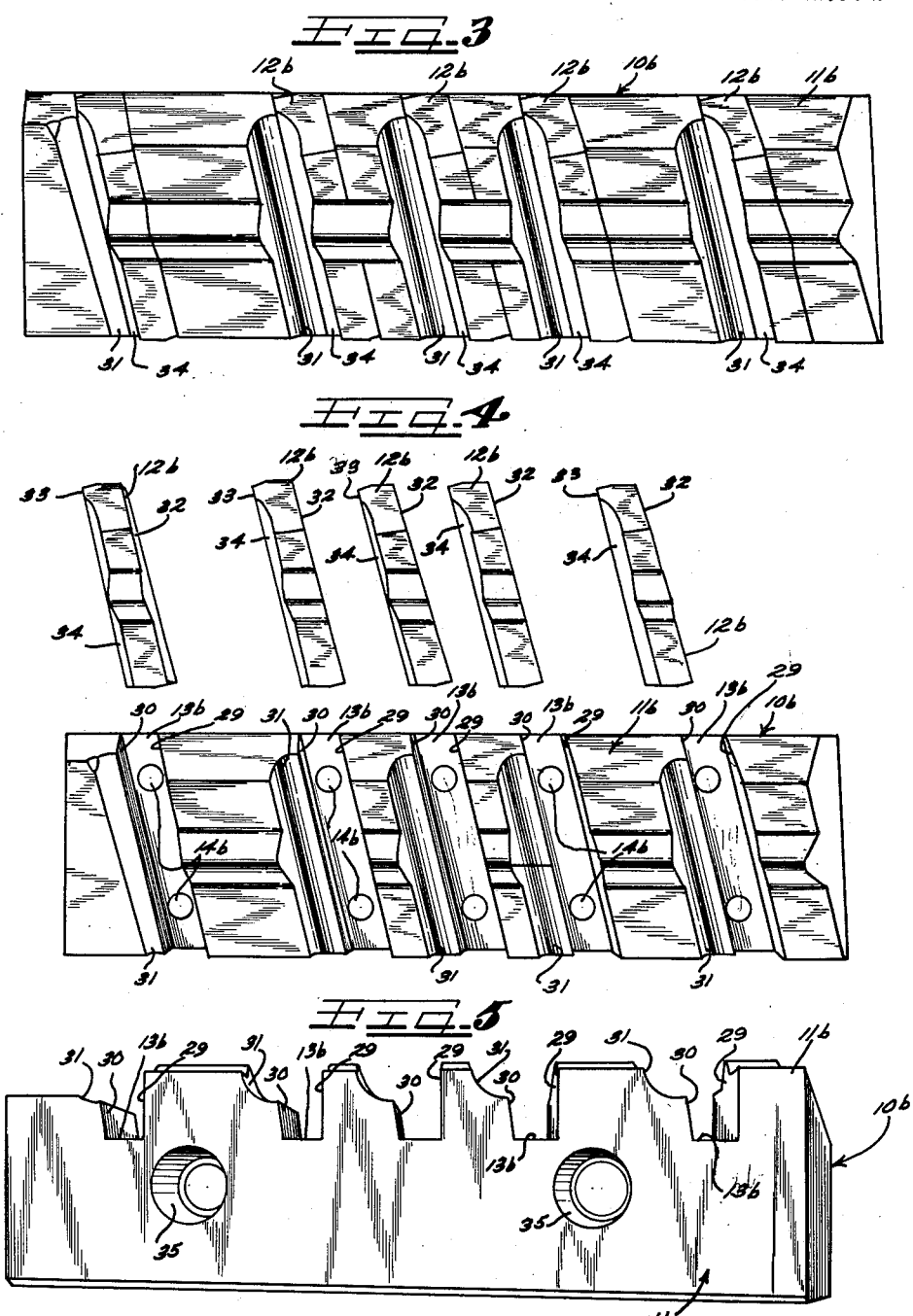

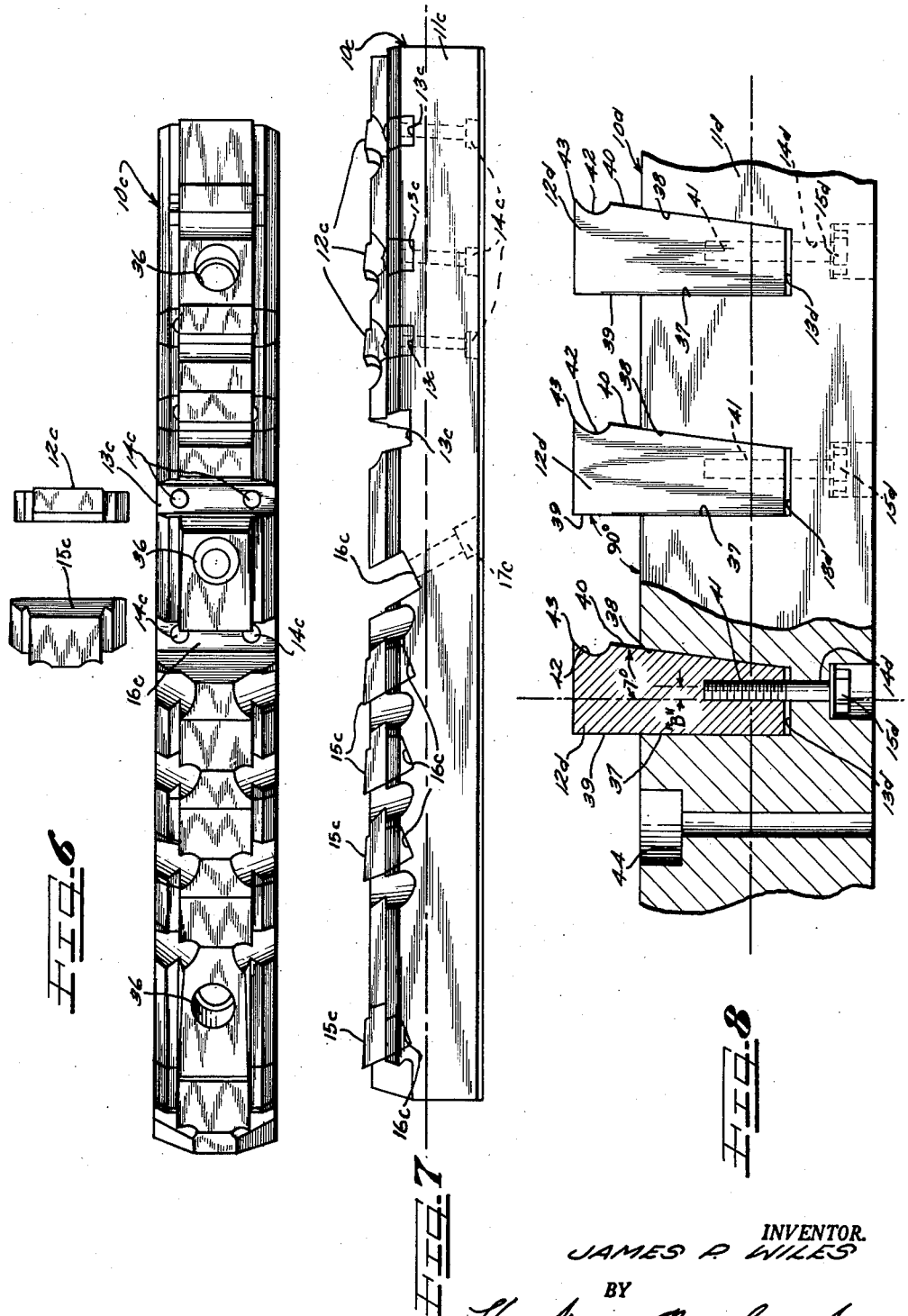

3,126,611
BROACH INSERT WITH REMOVABLE TEETH
James P. Wiles, Cleveland, Ohio, assignor to Thompson Ramo Wooldridge Inc., Cleveland, Ohio, a corporation of Ohio
Filed Sept. 25, 1961, Ser. No. 140,481
2 Claims. (Cl. 29—95.1)

This invention relates to broach inserts for removing metal and the like by broaching and more particularly to a broach insert construction having removable teeth secured therein.

The present invention provides a broach insert having removable teeth secured in a manner which does not weaken the insert and which affords adjustment of the position of the teeth for wear take-up, if desired.

Generally, broach inserts have been unitary structures whose usefulness was limited to the life of the teeth formed thereon. Also, each new configuration for the teeth required two or three sets of inserts, with the result that substantial inventories of these inserts would be built up, thus involving substantial outlays in initial cost and in storage. The present invention permits new configurations to be formed by changing the contours of the tooth blanks alone. These blanks may be relatively inexpensive so that a tremendous saving results.

In one embodiment of the invention, the insert is formed with tooth recesses having one side transversely serrated and the other side substantially smooth, with the teeth being adjustable outwardly of the broach by virtue of a complementary serrated construction on one side and a smooth construction on the other, so that the teeth can be slid into the broach insert body at a desired elevation relative thereto. The teeth may be secured in position by wedge elements received in the broach insert body in abutting relation to the smooth side of the teeth and positionable in complementary recesses by bolt elements or the like threaded into the wedges.

In another embodiment of the invention, the teeth are secured in broach insert body recesses therefor by means of bolt elements extending from the rear of the insert into the teeth. In a preferred form, the recesses are beveled or inclined on one side and the teeth are complementarily inclined and secured in the recesses by bolt elements threaded thereinto from the rear of the broach insert body. This construction has the advantage of eliminating the need for a wedging or locking action with a separate wedge element, and permits a thick stock construction between the blade blanks which affords a high degree of strength in the broach insert body.

Accordingly, it is an object of the present invention to provide a broach insert with removable teeth, and which affords ease and economy in change of design, and full use of inventory stock.

Another object of the invention is to provide a broach insert as described which affords adjustment of the position of the teeth for wear take-up.

Another object of the invention is to provide a broach insert having removable teeth and which permits the use of a wide variety of tooth contours in a single broach insert body.

Another object of the invention is to provide a broach insert having an exceptionally long life as a result of the removable tooth construction thereof.

Another object of the invention is to provide a broach insert, which, in a particular embodiment thereof, eliminates the need for accessory wedging and locking means as a result of the bolting of the tooth blank from the bottom of the insert.

Another object of the invention is to provide a broach insert as described which affords a thick stock construction between the blade blanks to maintain a high degree of strength in the insert, the stock construction between the blade blanks being sufficiently thick to avoid distortion.

Other objects and advantages of the invention will become apparent as the description proceeds in accordance with the drawings in which:

FIGURE 1 is a perspective view of one embodiment of a broach insert according to the present invention and of a tooth blank therefor;

FIGURE 2 is a perspective view of another embodiment of a broach insert according to the present invention and of a tooth blank and wedge structure therefor;

FIGURE 3 is a top plan view of another embodiment of a broach insert according to the present invention;

FIGURE 4 is a top plan view of the structure shown in FIGURE 3 with the removable teeth in removed position relative thereto;

FIGURE 5 is a side elevational view of the structure shown in FIGURE 4 with the teeth being removed;

FIGURE 6 is a top plan view of another embodiment of the broach insert of the invention, with separate tooth blanks being in removed relation thereto;

FIGURE 7 is a side elevational view of the structure shown in FIGURE 6 with the removed teeth not being shown; and FIGURE 8 is a side elevational view, partly in vertical section and broken away, of another embodiment of the broach insert of the invention.

Referring now to the drawings, and to FIGURE 1 in particular, a broach insert 10 is shown in accordance with the invention which includes a broach insert body 11 and blanks 12 corresponding to removable teeth to be used in the insert body 11.

The broach insert is secured to the bed of a broaching machine (not shown) for machining a material form or workpiece (not shown).

Typically, a broach insert is utilized in a machine in which the broach extends, for example, for one hundred inches; and two or three sets of spare broach inserts are kept in inventory. The broach insert structure 10 eliminates the need for keeping spare inserts on hand and eliminates the costly construction of separate broaches for each new tooth configuration desired.

To this end, the broach body 11 defines a plurality of axially spaced transverse recesses 13 dimensioned to snugly receive teeth corresponding to the blank 12 and to maintain the teeth securely and so that a desired amount thereof extends outwardly of the broach body. In the form shown, the recesses 13 extend perpendicularly into the branch body from a front face thereof, and bolt receiving recesses 14 are formed in the body to extend from the rear face into the bottom of the recesses 13. One pair of the openings 14 are shown in the example given, each with enlarged rearward portions to accommodate the bolt heads. The bolts are generally indicated by reference numeral 15 and are adapted to be securely received in the openings 14 and to extend into complementary threaded openings 16 in the tooth blanks 12. It will, of course, be appreciated that the tooth blanks may have the form shown or may be machined to a desired configuration, in accordance with the particular operation intended, and that variations in the number of openings 14 are encompassed within the scope of the invention.

Accordingly, the teeth or tooth blanks 12 may be mounted from the bottom of the insert body 11 by positioning the bolts 15 in the openings 14 and threading the bolts into the registered openings 16 until the bottoms of the blanks or teeth are pulled securely against the bottoms of the corresponding recesses 13.

The body 11 of the insert also defines a plurality of openings 17 through which bolt members may be inserted to secure the insert in the broach, as will be understood by those skilled in the art.

Referring now to FIGURE 2, another embodiment of the broach insert of the invention is shown and designated by reference numeral 10a, which is also characterized by a removable tooth construction and includes a body 11a and removable teeth indicated at 12a.

In this form of the invention, recesses 13a are provided each of which is formed with one transverse side 18 serrated from end to end and another side 19 having a smooth construction and extending substantially perpendicularly to the longitudinal axis of the insert. The teeth 12a have a complementary construction and are formed with one side 20 serrated from end to end and another side 21 of a preferably smooth exterior surface characteristic. It will therefore be seen that the teeth 12a may be slid into position in the recesses 13a, as hereinafter further described, in mating engagement therein, as positioned by the serrations in the recesses and teeth respectively.

In order to maintain the teeth 12a in the described position in the body 11a, the body 11a also defines recesses or cut-out portions 22 opening into the recesses 13a and characterized by a segmental circular horizontal cross-sectional configuration and a substantially frusto-conical configuration vertically. The recesses 22 are adapted to receive complementary jack-lock wedges 23 having a corresponding horizontally segmental circular configuration and a vertically frusto-conical configuration; and the jack-lock wedges 23 also define internal bores 24 threaded to receive threaded bolts 25 therein whose axial position may be adjusted by Allen wrench means or the like.

When the jack-lock wedges or wedge elements 23 are seated within the recesses 22 with the bolts 25 relatively elevated therein as shown, the teeth 12a may be freely and slidably inserted in the recesses 13a as described.

Upon threading of the bolts 25 downwardly into the wedge elements 23, the wedge elements will be raised by bottoming of the bolts 25 on the body portion 11a, the recesses 22 having bottom walls which may, if desired, be substantially coplanar with the bottoms of the recesses 13a. Elevation of the wedge elements 23 by further threading of the bolt elements 25 downwardly will serve to cam the wedge elements 23 against the smooth sides 21 of the teeth 12a, with the smooth chord faces 26 of the wedge elements being maintained in continuous engagement therewith.

An advantage of the construction shown in FIGURE 2 is that upon wear in a particular tooth 12a, the tooth may be removed by loosening of the corresponding bolt element 25, in the example shown, and thereupon the tooth may be reinserted at a higher elevation by mating engagement between upper serrations, in the manner hereinabove set forth. Rethreading of the bolt elements 25 downwardly will again serve to cam the wedge elements against the teeth 12a to maintain the adjusted elevated position of the teeth until such time as another adjustment or replacement is desired.

The body 11a also defines transverse openings 27 for locking the insert in position and bottom openings 28 also for securing the insert in the broach, as understood by those skilled in the art.

It will again be appreciated that various configurations for the teeth may be provided by removal of individual teeth and replacement with differently contoured teeth, without the expense of machining an entire broach insert as has been required previously.

Referring now to FIGURES 3–5, another embodiment of the invention is shown wherein a broach insert 10b includes a body portion 11b and teeth 12b for releasable engagement therein as hereinabove set forth. The body portion 11b defines a plurality of transversely formed recesses 13b which are, however, offset slightly from the transverse axis of the body portion and formed in spaced parallel relation as shown. The recesses 13b are characterized by the provision of a vertical side wall 29 and a downwardly and inwardly inclined side wall 30 as hereinafter further described. In the particular form of the invention shown, the side wall portions 30 intersect arcuately cut wall portions 31.

The teeth 12b are formed with vertical side walls 32 complementary to the side walls 29 and beveled side walls 33 extending downwardly and inwardly relative to the walls 32 and complementary to the walls 30 in the bottom portion 11b. The teeth also have cut-out portions 34, in the form shown, adapted to form a continuation of the arcuately cut-out portions of surfaces 31 in the body 11b. The relation may be seen in FIGURE 3.

In accordance with the invention, openings 14b are formed in the body portion 11b and extend from the rear of the body portion into the respective recesses 13b, a pair of the openings 14b being provided for each of the recesses 13b in the form shown. The walls 30 are offset relative to the axes of the openings 14b and to the axes of the bolts 15b to be inserted therein, and the teeth 12b have openings (not shown) complementary to the openings 14b to receive the bolts so that the teeth may be drawn snugly against the walls 30 with respect to the sides 33 of the teeth and the teeth thereby securely positioned.

The body portion 11b of the insert defines transverse openings 35 in order to secure the insert to the broach. The body portion 11b may also have body openings in the rear thereof (not shown) for this purpose.

Referring now to FIGURES 6 and 7, another embodiment of the invention is shown, substantially similar in its basic features to the embodiment of FIGURES 3–5, and wherein the insert 10c includes a body portion 11c and teeth 12c and 15c. The body portion 11c defines recesses 13c, having a relatively vertical alignment and being substantially similar to the recesses 13b. The recesses 13c also receive teeth 12c substantially similar to the teeth 12b and secured in a corresponding manner by means of openings 14c in the recesses, adapted to receive bolt means (not shown) to be threaded in the complementary teeth to snugly engage the teeth in the recesses for use until replacement is required or desired.

The insert body 11c may also have angled recesses 16c for receiving complementarily formed teeth 15c, and in this construction openings 17c may be angled in parallel with the angle of the respective recesses 16c for secure connection of bolt means therein (not shown) with the left-hand teeth 15c.

The insert body 11c may have vertical openings 36 therein at predetermined spaced points therealong for connection with the broach, as understood by those skilled in the art.

The respective teeth thus afford a flexible broaching operation which can be varied by varying the contour of the teeth, with replacement or variation of the contour of the teeth being readily accomplished as desired.

Referring now to FIGURE 8, another embodiment of the invention is shown as indicated by reference numeral 10d, and which comprises a broach insert body 11d and broach insert teeth 12d. In this form of the invention, recesses 13d are formed in the insert body 12d which are characterized by the provision of a vertical wall 37 perpendicular to the longitudinal axis of the body 11d, and a wall 38 which is opposite thereto and inclined downwardly and inwardly relative thereto. Further, in accordance with the invention, the body portion 11d defines bolt openings 14d which extend perpendicular to the longitudinal axis of the body portion 11d and parallel to the wall 37. It will also be noted that the openings 14d are displaced relative to the center line of the bottoms of the recesses 13d, and are closer to the walls 38 than to the walls 37 as is readily discernible in the view of tooth 50 as shown in section in FIGURE 8, wherein the offset distance is indicated by the reference letter "B." In the previously described constructions, bolt openings to the rear of the body insert were provided which in general were centered relative to the recesses for the teeth, FIGS. 3–5.

The teeth 12d have a configuration complementary to the recesses 13d and thus each includes a wall 39 which is substantially perpendicular and adapted to be in abutting relation with a wall 37, and a wall 40 which is downwardly and inwardly inclined relative to the wall 39 and adapted to be in abutting relation with a wall 38. The bolts 15d inserted in the openings 14d are threadedly engaged in complementary openings 41 in the teeth which are parallel to the wall 39 and to the plane of the teeth, but closer to the walls 40 than to the walls 39.

The invention thus described with reference to FIGURE 8 affords a positive locking action by virtue of the offset of the walls 39 relative to the bolt axes, so that upon threading of the bolts 15d into the tooth openings 41, the teeth are pulled tighter, progressively, and the relatively proximate relation of the bolt openings 14d to the walls 38 brings the walls 40 of the teeth into increasingly tight wedging engagement with the insert body walls 38.

In the embodiment of FIGURE 8 the bottoms of the teeth 12d never touch the bottoms of the recesses 13d, and a positive locking action is thus produced, by means of the interface engagement between the walls or surfaces 38 and 40. The offset of the walls 38 relative to the bolt axes, may, in a suitable embodiment, be offset a predetermined angle from the perpendicular as shown at "A" in FIGURE 8, and this angle is preferably in the order of 7°. This construction also affords the advantage that slight variations in tolerances between the teeth and the recesses therefor will not prevent effective positioning of the teeth in the recesses, and wear take-up may be accomplished by adjustment of the bolts 14d.

The teeth 12d have arcuate recesses 42 formed transversely along the upper marginal edges to form tooth edges 43, in the form shown, but it will be appreciated that a wide variety of tooth structures is encompassed within the scope of the invention as hereinabove indicated.

Also, the insert body may have vertical openings 44 for receiving bolt means to secure the body portion 12d to a broach, as previously set forth, and variations in this and other features of the body may be encompassed within the scope of the invention.

There has thus been provided a broach insert having a wide range of applications and which affords large economies, as indicated by the feature that broken teeth would not necessitate scrapping the broach, since new teeth could be inserted; that undersized inserts could be brought back to size and the cost of shims used to bring the cutter to print size reduced; and particularly, that design changes for the broach insert would not necessitate a completely new broach. Thus the teeth for an old design can, according to the invention, be removed, and new teeth added and ground to new configurations and sizes as desired. Further, where a substantial inventory of broach inserts is on hand, these may be made use of by forming cutters with the new teeth inserted in the available insert bodies and ground. Also, design may be standardized with a broach insert according to the invention.

Although I have herein set forth and described my invention with respect to certain particular features and details thereof, it will be understood by those skilled in the art that these may be varied without departing from the spirit and scope of the invention as set forth in the hereunto appended claims.

I claim as my invention:

1. A broach insert structure comprising,
   an elongated broach insert body extending on a longitudinal axis and having a pair of flat parallel longitudinal extending faces,
   a plurality of transverse recesses formed in said body opening toward one longitudinal face of the body,
      each of said recesses having a transverse side extending substantially perpendicularly to said axis of the body and an opposite side extending inwardly and downwardly to form a wedge surface,
   a plurality of teeth formed complementarily to the recesses and each having a side adapted to abut the perpendicularly extending side of a recess and a side opposite thereto inclined complementarily to the wedge surface of the recess, and
   bolt means threadedly securing each of the teeth in said recesses from a face of the body insert opposite the first mentioned face to cause the inclined surfaces of the teeth to wedge against the wedge surfaces of the recess,
      said bolt means extending into the teeth in offset relation to a line midway between the transverse sides of the recesses at the bottom of the recesses and in the direction of said wedge surfaces.

2. A broach insert structure comprising,
   an elongated broach insert body having a pair of longitudinally extending flat parallel faces,
   means defining a plurality of spaced parallel recesses formed in said body,
      said recesses extending substantially transversely to the longitudinal axis of said body and opening to one of said faces to form alternate recesses and completely solid surfaces therebetween on said one of said faces,
      each of said recesses having one side extending substantially perpendicularly to said axis and another side extending at an incline toward said one side and downwardly away from said one of said faces to form a wedge surface,
   a plurality of teeth formed complementarily to the recesses and each having a side adapted to abut the perpendicularly extending side of a recess and a side opposite thereto inclined complementarily to the wedge surface of the recess,
   means defining a plurality of openings formed in said body and extending substantially perpendicularly to said longitudinal axis,
      said openings extending respectively from one of said recesses to the other of said faces, and
   bolt means in said openings threadedly securing each of said teeth in one of said recesses from said other of said faces of the body and causing the inclined surfaces of the teeth to wedge against the wedge surfaces of the recesses.
      said bolt means extending into the teeth in offset relation to a line midway between the transverse sides of the recesses at the bottom of the recesses and in the direction of said wedge surfaces.

References Cited in the file of this patent

UNITED STATES PATENTS

| | | |
|---|---|---|
| 1,729,050 | Olson | Sept. 24, 1929 |
| 1,908,628 | Redinger | May 9, 1933 |
| 1,927,409 | Markstrum | Sept. 19, 1933 |

(Other references on following page)

UNITED STATES PATENTS

| | | |
|---|---|---|
| 1,951,101 | Miller | Mar. 13, 1934 |
| 2,037,642 | Scribner | Apr. 14, 1936 |
| 2,044,495 | Bullard | June 16, 1936 |
| 2,173,074 | Romaine | Sept. 12, 1939 |
| 2,255,221 | La Pointe | Sept. 9, 1941 |
| 2,392,823 | La Pointe | Jan. 15, 1946 |
| 2,407,519 | Slater | Sept. 10, 1946 |
| 2,538,844 | Nimz | Jan. 23, 1951 |
| 2,656,590 | Hooper | Oct. 27, 1953 |
| 2,697,271 | Phaneuf | Dec. 21, 1954 |
| 2,730,793 | Anthony | Jan. 17, 1956 |
| 2,780,856 | Traycoff | Feb. 12, 1957 |
| 2,831,241 | Bader | Apr. 22, 1958 |
| 2,855,656 | Poynter | Oct. 14, 1958 |
| 2,998,634 | Raehrs | Sept. 5, 1961 |

FOREIGN PATENTS

| | | |
|---|---|---|
| 507,265 | Great Britain | June 13, 1939 |